United States Patent [19]
Dixon

[11] Patent Number: 4,797,893
[45] Date of Patent: Jan. 10, 1989

[54] MICROLASER SYSTEM

[75] Inventor: George J. Dixon, Lutz, Fla.

[73] Assignee: Virgo Optics, Inc., Port Richey, Fla.

[21] Appl. No.: 59,804

[22] Filed: Jun. 9, 1987

[51] Int. Cl.$^4$ .................. H01S 3/16; H01S 3/082
[52] U.S. Cl. .......................... 372/66; 372/19; 372/34; 372/41; 372/71; 372/99
[58] Field of Search .............. 372/19, 20, 23, 34, 372/39–41, 98, 99, 105, 106, 71, 75, 66

[56] References Cited

U.S. PATENT DOCUMENTS

| | | | |
|---|---|---|---|
| 3,432,768 | 3/1969 | Garwin | 372/23 |
| 3,628,173 | 12/1971 | Danielmeyer | 372/20 |
| 3,753,145 | 8/1973 | Chesler | 372/71 |
| 4,739,507 | 4/1988 | Byer et al. | 372/66 |

OTHER PUBLICATIONS

Smith et al.; "High-Power—Filters"; The Bell System Technical Journal; May–Jun. 1969; pp. 1405–1419.
Kane et al.; "Monolithic—Ring Laser"; Optical Society of America; vol. 10, No. 2; 02/1985; pp. 65–67.
Kane et al.; "Coherent—Nd: Yag Lasers"; Optics Letters; vol. 12; No. 4; 04/1987; pp. 239–241.
Culshaw et al.; "Two Component—Nd: Yag Lasers"; IEEE Journal of Quantum Electronics, vol. QE-7, No. 8, 08/1971; pp. 381–387.
Wiesemann; "Longitudinal Mode—Reflectors"; Applied Optics; vol. 12, No. 12; 12/1973; pp. 2902–2912.
Culshaw et al.; "Efficient Frequency—Nd: Yag Laser"; IEEE Journal of Quantum Electronics, vol. QE-10, No. 2; 02/1974; pp. 253–262.
Zhou et al.; "Efficient,—Nd: Yag Laser"; Optics Letters; vol. 10; No. 2; 02/1985, pp. 62–64.

Primary Examiner—William L. Sikes
Assistant Examiner—Xuan T. Vo
Attorney, Agent, or Firm—A. J. Torsiglieri

[57] ABSTRACT

A microlaser comprises a solid state gain medium, such as YLF or YAG, positioned end to end with a mode selector etalon formed by a fused silica flat, the end of which is adjacent to a planar end of the gain medium is coated with a thin film of nichrome and the other end of which is coated with a multilayer-dielectric partially-transmissive reflector. The other end of the gain medium is curved and coated to be reflective of the laser light and transmissive of the pump light which enters through such end. The thin nichrome film is designed to absorb unwanted modes which have an electric field component at such film while a wanted mode has a null at such film in their standing wave patterns. By substituting birefringent crystalline quartz for the fused-silica, there may be derived emission at two longitudinal modes whose polarization vectors are orthogonal and whose wavelengths are slightly different.

19 Claims, 1 Drawing Sheet

MICROLASER SYSTEM

This invention relates to lasers and more particularly to compact, miniature lasers of the kind to be described as microlasers. For purposes of this application a microlaser is one in which the length of the optical cavity included therein is no greater than about thirty millimeters, or much more than one inch.

BACKGROUND OF THE INVENTION

There is an increasing need for microlasers, particularly of the type having single longitudinal modes.

Various techniques are known for limiting the output of a microlaser to essentially a single longitudinal mode. The number of modes at which a laser can oscillate is generally determined by the number of the modes that are established in the laser cavity whose gain is sufficient to initiate the onset of oscillations. Accordingly, the number of possible oscillation modes can be kept small by using a short optical cavity for the laser.

However, for output powers in excess of about one milliwatt, it is difficult to achieve reliable single longitudinal mode operation with monolithic-rod solid state lasers. Pump limited single mode operation has been obtained from a monolithic out-of-plane ring (MISER) but at the expense of considerable complexity in crystal fabrication and housing design. Alternatively, single mode pulses have also been obtained by gain switching a monolithic rod, a technique which also tends to be complex.

The use of etalon mode selectors have been proposed as an alternative to the approaches described above and they offer promise for a simple rugged single mode laser. In microlasers, the gain medium, or active lasing element, has been used as a mode selecting transmission etalon within the laser cavity. However, this technique results in lasers which tend not to be particularly stable.

There has also previously been proposed a solid state single mode laser in which an absorptive element, such as a metal film, is located at a null in the electric field of the standing wave in the optical cavity of a desired single axial mode, to little affect such mode but to attenuate other axial modes whose electric field is not zero at the region of the metal film. In particular, a paper which appeared in the *Bell System Technical Journal*, May-June 1969 describes at pages 1416–1418 a laser system in which a Nd-doped YAG rod, 3 centimeters long, is side-walled pumped in an elliptical cylinder, and the optical cavity comprises a partially transmissive curved mirror that serves as the first reflector of the cavity and a fused silica flat having a thin metal coating on one surface and a high reflectivity coating on the other surface for serving as the second reflector of the cavity. The two reflectors were spaced apart 20 centimeters, nearly seven times the length of the YAG rod, which results in a laser longer than desirable for many applications.

Subsequently in a paper in the *IEEE Journal of Quantum Electronics*, August 1971, pages 381–387 there is analyzed for use as a mode selector for a single mode YAG laser, typically at least fifteen centimeters long, an etalon comprising a two millimeter quartz flat with a thin nichrome metal film on one surface and a number of quarter-wavelength dielectric layers on the opposite surface to provide a partially transmissive mirror for use as an output coupler with the amount of output coupling being determined by the number of layers. This mode selector too depends on locating the thin metal film at a null in the electric field of the standing wave pattern of a desired single axial mode. The paper additionally analyzes, also for use as a mode selector an etalon comprising a quartz flat each of whose surfaces is coated with a thin metal film and concludes that the latter etalon has properties for mode selection superior to the former etalon. The paper finally proposes and describes tests on a sidewall-pumped Nd-doped YAG laser in which the first described multilayer reflector-absorbing film etalon is combined with an intra-cavity tilted Fabry-Perot etalon to form a two-component mode filter that is described as overcoming the difficulties of the other arrangements at higher levels of output power.

In Optics Letters, Volume 10, No. 2, February 1985, there is described a miniature YAG laser which is end-pumped with a laser diode. The YAG rod is provided with one curved end surface that is suitably coated to serve as a reflective mirror at the laser frequency but to remain transparent to the pumping light that is focused by a gradient index optical fiber lens into this end of the rod. The other end of the rod was also curved but suitably coated to be highly reflective at the pumping frequency and partially transmissive at the laser frequency for output coupling. However, the maximum continuous output power that was reported to have been reached was 4.4 milliwatts with an overall electric-to-optic efficiency of 1.5%, although it has proven difficult to reproduce these results. The laser was found to oscillate both in a single axial and in a single transverse mode, apparently without use of any separate frequency mode selector, with rods three and five millimeters long. Temperature tuning was used.

The various prior art discussed above indicates that there is still need for a single mode microlaser which can provide tens of milliwatts of output power with a simple rugged structure and in one aspect the invention is directed to this end. In particular, in an illustrative embodiment the invention is a microlaser with an optical cavity less than one centimeter long. In an alternative embodiment, by use of an etalon that includes a birefringent flat, there results a microlaser whose output includes two longitudinal modes whose polarizations are orthogonal to one another and whose frequencies are sufficiently different to be readily separated.

SUMMARY OF THE INVENTION

In one illustrative embodiment, a laser includes a cylindrical rod of a gain medium, such as Nd-doped YAG or YLF, which is homogeneously broadened. One end of this rod is curved and coated to serve as a reflector at the laser frequency but to transmit light of the pumping frequency. The other end of the rod is planar to freely transmit the stimulated light. Fixed near the planar end surface of the rod is a mode selection etalon comprising a fused silica flat, one surface of which is coated with a thin metal film, such as nichrome, and the other surface of which is covered with a multilayer reflector. The rod is end-pumped through its curved end by light from a diode laser. The rod and the etalon are included in an oven for temperature tuning. The resultant is a rugged simple structure that can be handled essentially as a monolithic rod laser.

Such a laser end pumped by a dye laser has provided continuous single mode output power of tens of milliwatts and it is anticipated that with the substitution of a diode laser as the end pump, an electric-to-optic efficiency of at least eight percent can be attained.

Moreover, by the substitution in the mode selector etalon of a flat of a birefringent material, such uniaxial crystalline quartz, oriented so that a light beam passing through the flat will see different indices of refraction depending on the orientation of its polarization vector, there was made available emission consisting of two distinct longitudinal modes having orthogonal polarization and with a frequency spacing of as much as tens of megahertz.

Various other embodiments are possible as will be described more fully in the detailed description taken in with the accompanying drawing.

Figure 1:
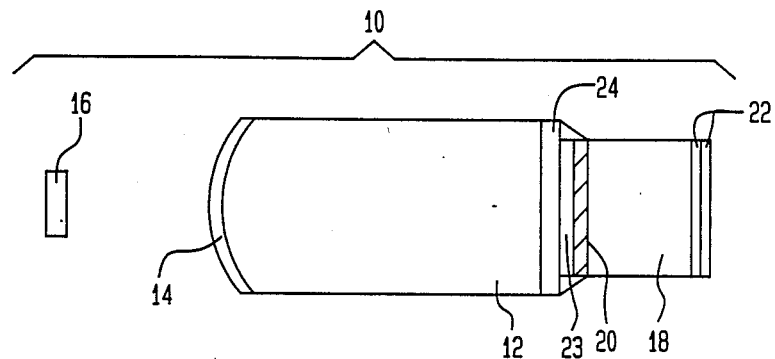
FIG. 1 shows in axial cross section an illustrative embodiment of a microlaser in accordance with the invention.

It should be appreciated that to simplify the exposition in the drawing the dimensions of the various components depicted are not necessarily to scale.

DETAILED DESCRIPTION OF EMBODIMENTS

With reference now to the drawing, the microlaser 10 shown in FIG. 1 includes the gain element, illustratively a section of a cylindrical rod 12 of a suitable gain medium. The left end surface of the rod is curved, and this end surface is coated with multilayer dielectric mirror 14 designed to be highly reflective of the desired laser light stimulated in the rod. This multilayer coating 14 is also designed to be highly transmissive for the pumping light supplied by a gallium-arsenide injection laser 16 whose output is aligned for end pumping of the rod in known fashion. Suitable optics (not shown) may be included to improve the efficiency of the pumping. The other end of the rod is planar and cut perpendicular to the axis of the rod. Bonded to the planar end of the YAG rod 12 is the fused silica rod or flat 18 whose opposite ends are parallel planes perpendicular to the rod axis. A metal layer 20, for example of nichrome, is coated on the inner one end surface of the fused silica rod to serve as an absorptive layer for any stimulated light which has an electric field component at the metal layer. The opposite outer end surface of the fused silica rod is coated with a multilayer dielectric mirror 22 that will transmit a small fraction, enough to serve as the useful output, typically between three-tenths and five percent, of the stimulated laser light incident thereon. The length of the fused silica rod will be tuned so that the absorptive layer corresponds to a null of the electric field of the standing wave pattern of a desired single mode of the stimulated light. This happens when the length of the fused silica rod corresponds to an integral number of half wavelengths of the standing wave pattern of the stimulated light.

The metal-coated end of the fused-silica rod is bonded with cement to the planar end of the gain medium rod 12 to form a rugged integral structure that can be handled essentially as a monolithic laser rod. The two ends are desirably cemented such that a small air gap 23 is allowed to be created between the end of the rod 12 and the metal coating 20 in the central region. This air gap is less than a millimeter wide. It is usually advantageous to include an anti-reflection coating 24 on the planar end surface of the rod 12 to minimize reflections of the stimulated light at the discontinuity at its planar end. This coating advantageously is designed to reflect the pumping light however, for increased pumping efficiency.

Advantageously, the integrated structure is housed in an oven whose temperature can be varied for tuning the laser to the desired single mode. Basically, small changes in the temperature of the oven, typically set at initially at about 50° C. cause minute changes in the length of the cavity formed by the reflecting mirror 14 and 22 and the temperature is then fixed when single mode oscillations are observed to exit the partially transmissive mirror 22 at the end of the fused silica rod. This will correspond to a length of the fused silica rod that corresponds to a null in the electric field of the standing wave pattern of the lasing light. It also will correspond to a length of the cavity that is an integral number of half wavelengths of the lasing light, the usual condition for lasing. If desired, an automatic control system can be used to stabilize the operation.

In a typical design of a laser of this type, in which the optical cavity is less than ten millimeters long, the gain medium may be a neodymium-doped yttrium lithium fluoride (YLF) cylindrical rod about 3 millimeters in diameter and 3 millimeters in length with a convex radius of curvature equal to about 2 centimeters on one end and flat on the other end. The convex end would be coated with a dielectric reflector having greater than a 99.8 percent reflectivity at the laser wavelength of 1.047 microns and greater than 80 percent transmissivity at the pump laser wavelength near 792 nanometers. The flat end of the rod would be anti-reflection coated at 1.047 microns.

The mode selector etalon would be a fused silica cylindrical flat about 2 millimeters in diameter and 1 millimeter in length with both end surfaces polished plane and parallel. The inner end surface would be coated with a nichrome layer 75 to 100 Angstroms thick and the outer end surface would be coated with a multilayer dielectric reflector having a reflectivity of between 99 and 99.7 percent at the output wavelength. The etalon would be bonded to the gain medium advantageously only along its edges to leave a narrow air gap in the center where the light is concentrated.

The pump source may be a Sharp LT-024 diode laser operating at the wavelength of the YLF absorption near 792 nanometers. Since the YLF crystal is anisotropic, the polarization of the diode laser would be adjusted to maximize absorption. Suitable focusing optics would be associated with the diode laser to maximize the geometric overlap of the diode laser mode with the YLF laser mode. The laser diode is temperature-tuned to match the diode spectral output to the desired absorption of the YLF rod.

The use of YLF is preferred to insure stable operation at only a single longitudinal mode.

Alternatively, a laser of this kind with YAG as the gain medium has demonstrated continuous wave single-mode output powers greater than 35 milliwatts and is expected to be capable of twice that power with further refinements in the cavity design. However, because YAG is isotropic, it has the possibility of lasing in the system described at two longitudinal modes of slightly different wavelengths whose polarizations are orthogonal. As will be described in greater detail below, this possibility can be enhanced to provide intentionally such an output for special applications.

A laser of this kind has demonstrated continuous wave single-mode output powers greater than 35 milliwatts and is expected to be capable of twice that power with further refinements in the cavity design.

Several modifications are possible in the basic design which may be of particular interest for special situations. For example, the metal film could be coated on the planar end surface of the gain medium and the anti-reflection coating put on adjacent end surface of the etalon, thereby reversing the position of the two coatings.

Alternatively, the etalon may be bound to the planar end of the gain medium with an optical cement having an index similar to that of the gain medium in a manner to fill any air gap between the two ends, thereby obviating the need for any anti-reflection coating at the planar end of the gain medium.

Still another possible modification involves coating, in the last mentioned example, the metal film on the planar end of the gain medium rather than on the adjacent end of the etalon.

Additionally, it is feasible to substitute other gain media for the YLF. Nd-doped YAG is a promising substitute for output power at 1.064 microns. This should be pumped at about 810 nanometers for optimum efficiency. Dye lasers at 590 nanometers are suitable pumps at this wavelength. Also suitable are diode lasers at various wavelengths in the 750–810 nanometer range. Additionally, a variety of other host crystals can be used with neodymium ions, depending on the output wavelength desired, as is known in the art. Moreover, crystalline hosts of various kinds are known to be useful when doped with erbium or co-doped with holmium and thulium, depending on the output wavelength desired.

Various other materials may similarly be substituted for the nichrome as the thin film absorption medium in the mode selector. Gold and silver are typical alternatives. Metals have the advantage of wavelength independence. Although there will be suitable non-metals, the optimum thickness of the thin film will vary and is best determined experimentally. Too thick a film tends to add attenuation at the desired wavelength because the electric field null region is limited in width. Too thin a film may not add enough absorption of the undesired modes to be reliably effective.

The main factors typically affecting the frequency stability of any laser are variations in cavity length with temperature and vibrations of the structural components of the laser. In the microlaser laser described vibration effects are small since the miniature cavity assemblies have acoustic modes that are high in frequency, and most noise sources have little power at such frequencies.

Figure 2:
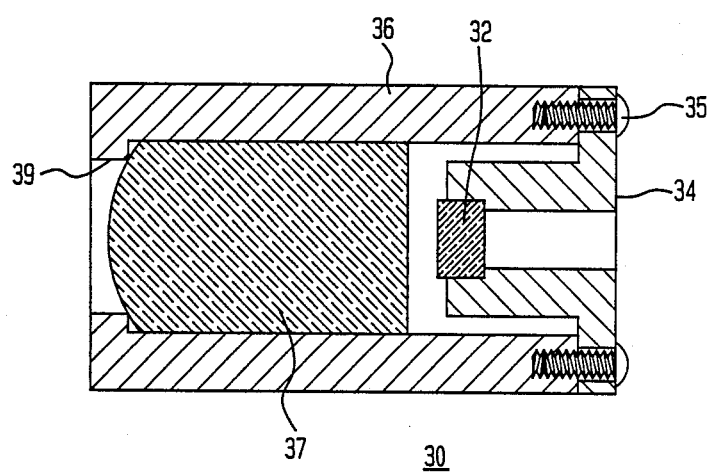
FIG. 2 shows in axial cross section a frequency stabilization arrangement for supporting the basic components of the microlaser shown in FIG. 1.

Temperature change affects the effective cavity length both by changing the refractive indices of the gain medium and of the mode selective medium and by their thermal expansion.

Where temperature stability is particularly important, it may be improved by the assembly arrangement 30 shown in FIG. 2. In this arrangement, the mode selector etalon 32, which may be of the kind used in the laser system of FIG. 1, is mounted on a piston 34. The piston is designed to have a positive coefficient of thermal expansion with temperature and is attached by screws 35 to form one end of a hollow cylinder 36 of Invar steel or other material having an extremely small thermal coefficient of expansion. The rod of gain medium 37 is housed within the hollow of the cylinder whose diameter is chosen for a close fit and seated against a lip 39 at the other end of the cylinder that limits any expansion the outward direction. The lip end of the cylinder is appropriately apertured to permit entry of the pumping light. The assembly is then incorporated into an oven whose temperature is closely controlled.

When heat is applied to the assembly, both the gain medium rod 37 and the mode selector rod 32 will expand, and their refractive indices will increase or decrease depending on the sign of the temperature coefficient. Typically, the net change in optical length for each of these rods will be positive. The lengths of the piston 34 and the Invar cylinder 36 are so chosen that their thermal expansion pushes the mode selector rod 32 closer to the gain medium rod 36. This movement effectively shortens the length of the optical path between the reflectors forming the two ends of the optical cavity. By balancing the thermal increase of the effective cavity length caused by the changes in refractive indexes and to by the thermal expansion of the rods with the thermal decrease in cavity length caused by the piston movement described, temperature stability is improved.

The basic laser arrangement described in connection with FIG. 1 can also be modified to provide for the emission of two distinct longitudinal modes having orthogonal polarizations and a frequency spacing of tens of megahertz. In particular, by use of a birefringent material in the flat 18 of the mode selector etalon, the laser may be made to oscillate in two orthogonal polarizations with different frequencies. The use of a simple birefringent element in a laser cavity to produce two output waves of orthogonal polarization and of different frequencies has been described in U.S. Pat. No. 3,588,738 which issued on June 28, 1971 for use in a frequency stabilization arrangement. As discussed therein, the different frequency modes arise due to the characteristic of birefringement material to exhibit a different index of refraction for orthogonal polarizations to cause the length of the optical cavity to be different for each of the two polarizations. Additionally for such operation, the gain medium advantageously should be both homogeneously broadened and isotropic. A plate of crystalline quartz (uniaxial) polished flat and parallel can be oriented so that a beam passing through will see different indices of refraction depending on the orientation of its polarization vector. The maximum and minimum indices correspond to two orthogonal orientations for the polarization known as the ordinary and extraordinary indices of refraction.

In one example using a crystalline quartz mode selection etalon of about a millimeter long, a YAG rod gain medium of length of about 2.3 millimeters, and a total cavity length of about 5 millimeters, a frequency difference of between 5 and 50 megahertz was obtainable and the relative frequency of the two modes was able to be kept within 5 kilohertz with proper temperature stabilization over periods of tens of seconds. These two modes can readily be separated for use as single mode waves in known manner.

Such a laser should have a number of applications. Typical is a Doppler lidar system of the kind described by Kane et al, *Optics Letters* 12,239. In such a system, a master oscillator and local oscillator are offset locked to one another and the master oscillator frequency signal is amplified and transmitted to the target. The back-reflected signal is then heterdyned with the local oscillator frequency signal to obtain meaningful information about the target. A two frequency laser of the kind described is useful in such a system to provide both the master oscillator signal and the local oscillator signal and the resulting need for frequency stabilization of only one laser would improve the reliability and convenience of such a system.

Another potential application of such a two frequency laser would be in a system in which information is sent by modulating the frequency difference of two polarizations and then transmitting them to a distant receiver. Information then could be recovered by the frequency spectrum of the signal received rather than its amplitude. The former should be less sensitive to noise than the latter.

It should be appreciated that the various specific examples described are merely illustrative of the general principles of the invention. Various other arrangements will become apparent to the worker in the art without departing from the spirit and scope of this invention.

What is claimed is:

1. In a microlaser system in which a solid state rod useful as the gain medium is included in an optical cavity and supplied at one end with pumping light for the stimulated emission of light from the rod at its opposite end and the optical cavity includes a mode selector for limiting the number of axial modes at which the microlaser oscillates, the improvement wherein said solid state homogeneously broadened gain medium, one end of rod comprises a said rod being curved and including a coating highly transmissive of pumping light and highly reflective of the desired stimulated light, and the other end of which is planar, a mode selection etalon comprising a flat of a material highly transmissive of the stimulated light, one planar surface of which is coated with a thin film of a material highly absorptive of the stimulated light——and the other planar surface of which is coated with a multilayer dielectric stimulated light for passage therethrough;

the axis of the gain medium rod being normal to the plane of the flat, the planar end of the rod being contiguous the thin film-coated surface of the etalon.

2. The microlaser system of claim 1 in which the planar end of the rod includes a anti-reflective coating for the stimulated light but reflective for pumping light.

3. The microlaser system of claim 2 in which the planar end of the gain medium rod is bonded to the thin-film coated surface of the etalon in a manner to leave an air gap between the adjacent surfaces of each.

4. The microlaser system of claim 2 in which the gain medium is neodymium doped yttrium lithium fluoride.

5. The microlaser system of claim 2 in which the gain medium is neodymium-doped yttrium aluminum garnet.

6. The microlaser system of claim 2 in which the flat is of fused silica and the thin film is of nichrome.

7. The microlaser system of claim 1 which further includes means for enclosing the gain medium and the mode selector etalon and for controlling their temperature for tuning the system into oscillations at a desired single longitudinal mode.

8. The microlaser system of claim 7 in which the means for enclosing including means for stabilizing the optical length between the curved face of the rod and the multilayer dielectric coated surface of the etalon by changing the spacing between the planar end of the rod and the adjacent end of the flat with changes in temperature to compensate for changes in the indices of refraction and in the thermal expansion of the rod and of the flat.

9. The microlaser system of claim 1 in which the flat is of a birefringent material and the gain medium is isotropic whereby there is available two outputs of orthogonal polarization and slightly different frequencies.

10. The microlaser system of claim 9 in which the flat is of uniaxial crystalline quartz.

11. The microlaser system of claim 9 in which the gain medium is taken from the group consisting of neodymium doped yttrium aluminum garnet and neodymium-doped yttrium lithium fluoride.

12. The microlaser of claim 2 in which the coating on the curved end of the rod is a multilayer dielectric reflector and the planar end of the rod includes a coating reflective of the pumping light but anti-reflective of the stimulated light and the mode selector etalon includes a flat which has a metal film on said one surface spaced from the planar end of the rod by less than a millimeter.

13. In a microlaser system in which a solid state rod useful as the gain medium is included in an optical cavity and supplied at one end with pumping light for the stimulated emission of light from the rod at its opposite end and the optical cavity includes a mode selector for limiting the number of axial modes at which the microlaser oscillates, the improvement wherein said solid state rod comprises a homogeneously broadened gain medium, one end of said rob bains curved and including a coating highly transmissive of pumping light and highly reflective of the desired stimulated light, and the other end of which is planar and transmissive of the stimulated light, a flat having one planar surface contiguous the planar end of the rod and the other surface coated with a reflector for providing a reflecting mirror that is partially transmissive of the stimulated light for passage therethrough, a thin film of a material absorptive of the stimulated light positioned between the planar end of the rod and the said one planar surface of the flat, and the axis of the gain medium rod being normal to the plane of the flat.

14. A microlaser in accordance with claim 13 in which the thin film is deposited on the planar surface of the flat.

15. A microlaser in accordance with claim 13 in which the reflector on the other planar surface of the flat is a multilayer dielectric coating.

16. The microlaser system of claim 13 which further includes means for enclosing the gain medium and the mode selector etalon and for controlling their temperature for tuning the system into oscillations at a desired single longitudinal mode.

17. The microlaser system of claim 16 in which the means for enclosing includes means for stabilizing the optical length between the curved face of the rod and the multilayer dielectric coated surface of the etalon by changing the spacing between the planar end of the rod and the adjacent end of the flat with changes in temperature to compensate for changes in the indices of refraction and in the thermal expansion of the rod and of the flat.

18. The microlaser system of claim 13 in which the flat is of a birefringent material and the gain medium is isotropic whereby there is available two outputs of orthogonal polarization and slightly different frequencies.

19. A microlaser in accordance with claim 1 in which the optical cavity formed by the coating on the curved surface of the rod and the multilayer reflector formed on the planar surface of the flat has a length which is less than ten millimeters long.

* * * * *